April 14, 1959 E. H. EBERHARDT 2,882,486
SECONDARY EMISSION MEASUREMENT
Filed Oct. 16, 1956 2 Sheets-Sheet 1
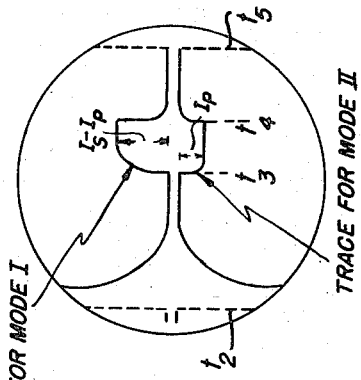
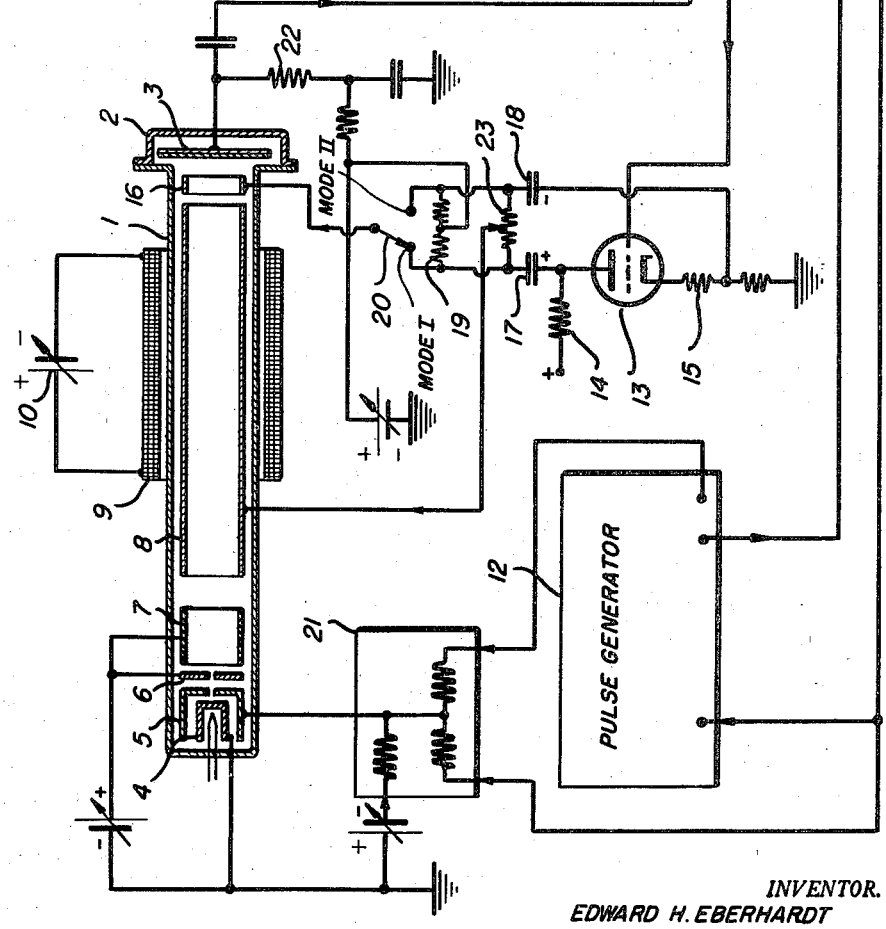
INVENTOR.
EDWARD H. EBERHARDT
BY George A. Gust
ATTORNEY United States Patent Office 2,882,486
Patented Apr. 14, 1959

2,882,486

SECONDARY EMISSION MEASUREMENT

Edward H. Eberhardt, Fort Wayne, Ind., assignor to International Telephone and Telegraph Corporation Application October 16, 1956, Serial No. 616,296

7 Claims. (Cl. 324—26)

This invention relates to measurement of secondary emission and is particularly directed to circuits and methods of reliably separating primary emission to, and secondary emission from, an insulating surface to be tested.

Considerable work has been done in the measurement of insulator secondary emission ratios, the most reliable method involving the use of a short pulse of beam electrons to the surface to be tested with oscilloscope observation of the resulting current pulses in the target and collector electrodes. This method is basically sound provided the pulse is short enough, the target capacity high enough, and the circuits of sufficient bandwidth to avoid pulse distortion. The most serious difficulty encountered in this method is the drifting or instability in the potential of the surface to be tested when continuous pulsing is used to give a visible scope presentation. No simple practical method, heretofore, has been evolved to stabilize the potential of the surface to be tested just prior to each test pulse. In most of the work reported heretofore, a certain degree of electrical conductivity is relied on to restore the surface potential between successive pulses. Unfortunately, really good insulating surfaces have electrical storage times of minutes or hours.

The object of this invention is to provide an improved circuit and method for measuring secondary emission ratios of insulator surfaces and the like.

The objects of this invention are attained in an evacuated test tube containing a target coated with the material to be tested, and containing an electron beam source with a control grid, and a collector ring adjacent the surface to be tested, characterized in that means are provided for bombarding an area of the target to stabilize the electrostatic potential of the area, and means for then cutting off the beam for a finite time without disturbing the electrode potentials in the tube, and means for successively applying distinctive positive and negative potential pulses of measured duration to the collector, and means for turning on and off the beam during the application of said potential pulses, and finally means for comparing the target currents during the positive and negative collector pulses. The shift of electric fields in the tube is separated time-wise from the read period, thus avoiding spurious output signals.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 shows in section a tube, and a circuit diagram, for testing secondary emission ratios according to this invention;

Fig. 3 shows an oscillogram of a typical secondary emission ratio measurement by the circuit of Fig. 1.

Figure 2:
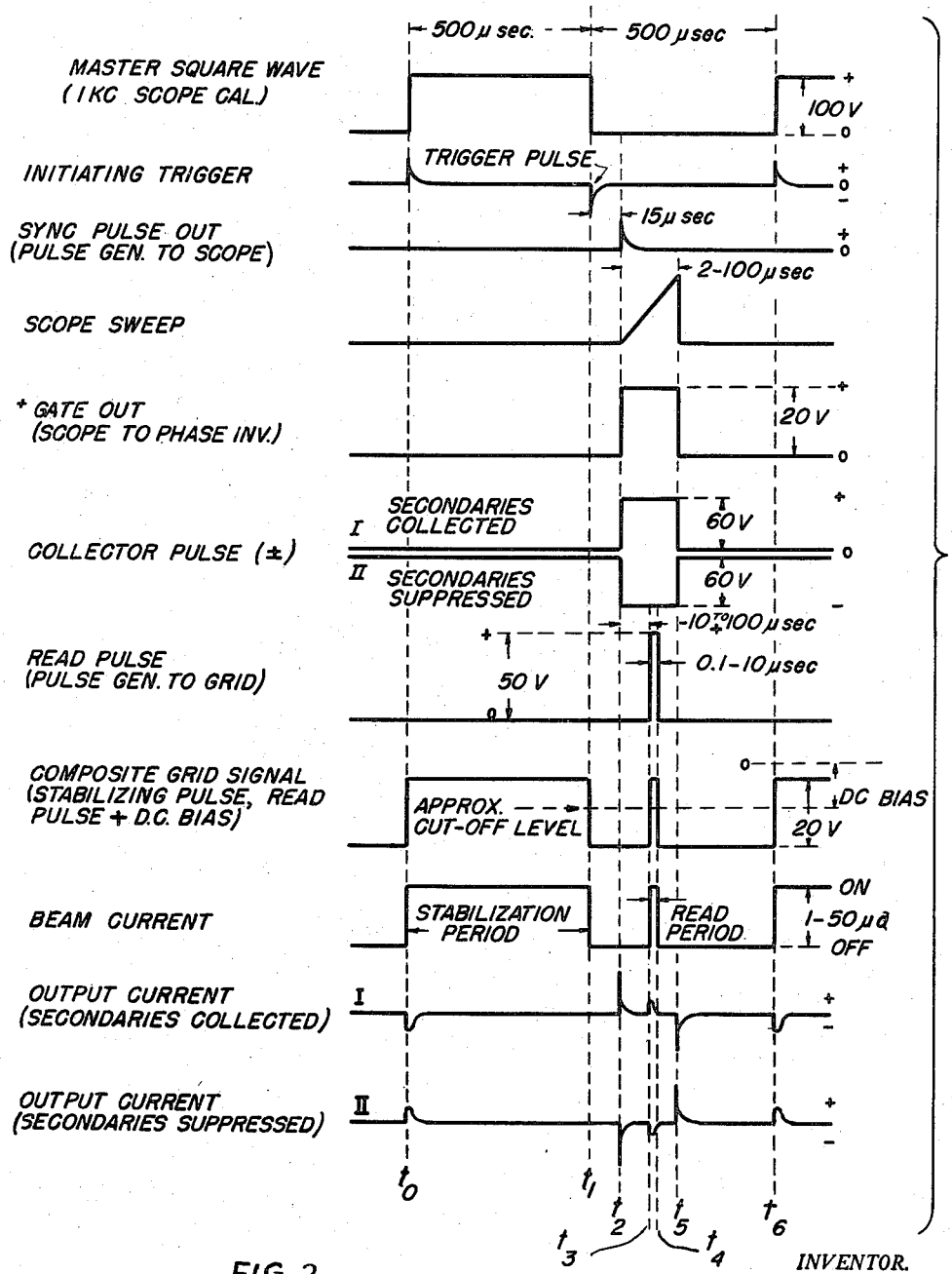
Fig. 2 is a set of voltage and current graphs applicable to the important parts of Fig. 1.

In Fig. 1, the envelope 1 comprises a demountable end 2 for receiving the target plate 3 on the front surface of which is coated material, the secondary emission of which is to be tested. At the other end of the envelope is a conventional electron gun comprising the indirectly heated cathode 4, control grid 5, first anode 6, second anode 7 and focusing tube 8. Surrounding the envelope is the focusing coil 9 connected to the adjustable direct current source 10 for focusing an electron beam on the center of the target 3. The size of the area on the target bombarded by the beam may be controlled by the current through the focusing coil 9 and/or the potential of the focusing tube 8.

The test equipment may conveniently comprise the oscilloscope 11 of any available commercial design in which there is embodied in the oscilloscope a conventional sweep generator and a conventional square wave oscillator. In addition, the pulse generator 12 is provided for generating short timed pulses for application to the control grid 5. Then, there is the phase inverter 13 with plate load 14 and cathode load 15 for, respectively, producing positive or negative pulses at the ends of the load resistors in response to pulses applied to the grid. These two pulses of positive and negative polarity are selectively applied to the collector ring 16 surrounding and immediately adjacent the area on the target to be tested. The coupling circuits here include the condensers 17 and 18 coupled between the two output points and inverter 13 and a resistance bridge 19, as shown. The selector switch 20 may be manually operated or motor driven, as desired, to provide rapid switching of positive and negative pulses to the collector 16.

To understand the operation of the circuits of Fig. 1, it should be considered in connection with the voltage and current graphs of Fig. 2. Each graph is laid out on a time base, divided into time intervals from $t_0$, $t_1$, $t_2$, $t_3$, $t_4$, $t_5$, and $t_6$. In operation from time $t_0$ to $t_1$, the control grid 5 of the electron gun is pulsed positively on, to turn on the electron beams. The collector, wall and target backing voltages are all maintained at a constant voltage, V, at which the secondary emission ratio is to be measured. If the secondary emission ratio is greater than unity, as it is in practically all cases of interest, the surface of the target bombarded by the electrons of the beam will be stabilized at or within a few volts of the potential V. This stabilization period, in one practical embodiment of Fig. 1, was fixed at 500 microseconds.

Between $t_1$ and $t_2$, about 15 microseconds, is a waiting period. At $t_1$ the beam is turned off by removing the positive grid volts and simultaneously triggering the cycle of the pulse generator 12 by using the differentiated falling grid voltage. After waiting about 15 microseconds to assure complete beam and steady-state conditions, the pulse generator puts out a synchronizing pulse to trigger the oscilloscope sweep at time $t_2$.

From time $t_2$ to time $t_5$ is the sweep period. As the oscilloscope is triggered at $t_2$ and the beam starts across the oscilloscope face, the oscilloscope also furnishes a flat-topped positive gate output for the same duration as the sweep time $t_2$ to $t_5$. This pulse is amplified and phase-inverted by inverter 13 to give either a positive or negative output pulse at 17 and 18, respectively. This pulse is plus or minus 60 volts in the embodiment contemplated here. Either the positive or negative pulse is applied to the collector, depending on the position of the selector switch 20. This output pulse is applied to the secondary electron collector electrode 16, which is a small ring between the wall and the target in the embodiment shown. The collector 16 is placed close enough to the target to assure either complete secondary electron collection when a positive pulse is applied or complete suppression of secondaries when a negative pulse is applied.

Between times $t_3$ and $t_4$ is the read-out. While the sweep period is in progress and the collector pulse is on, the electron beam is pulsed on at $t_3$ for a very short time, .1 to 10 microseconds being found desirable. The main pulse output of the pulse generator 12 is used for this purpose and is fed to the control grid through the mixer circuit 21 to give a very sharp, flat pulse of beam current during $t_3$–$t_4$. The effective current to the target surface then appears as a voltage across the load resistor 22 and is observed as an oscilloscope deflection. If the collector 16 is plus during the read pulse, then secondaries are collected and the output pulse height is proportional to $I_s - I_p$, where $I_s$ is the secondary current and $I_p$ is the primary current. On the other hand, if the collector is negative while the read beam current is on, the secondaries are suppressed and the pulse height is proportional to $I_p$. Rapid manual switching between the two nodes by switch 20 provides a quick method of observing the ratio of $I_s - I_p$ to $I_p$, thus yielding the SE ratio.

In Fig. 3, the two visual presentations on the cathode ray oscilloscope may be seen for comparison of the $I_p$ and $I_s - I_p$ values. Where the persistence of the screen is high and the switching rate at 20 is relatively fast, both presentations will appear as shown in Fig. 3. The relative amplitudes of the $I_p$ and the $I_s - I_p$ loops are readily observed and measured.

At $t_4$, the read period is completed and the beam is turned off. At $t_5$, the oscilloscope trace is ended and the collector returned to its base voltage, V. At time $t_6$, which is preferably 500 microseconds after $t_1$, the cycle is completed, whereupon the cycle may be repeated continuously at the frequency of the oscilloscope squarewave which may be, for example, one kilocycle per second.

It is imperative that the incident area under the beam during the stabilization period include all area bombarded during the subsequent read period. Since any change in electron beam velocity or lens configuration may result in a change of the incident area, it is desirable that any such changes be in such a direction that the beam incident area is smaller during the read period, $t_3$–$t_4$. This can be accomplished by careful consideration of the beam nodal characteristics typical of the solenoidal magnetic focus used, with operation on the proper portion of these characteristics. Alternatively, and according to an important characteristic of this invention, a special pulse of voltage to the tube wall is simultaneously applied with the collector pulse, of such polarity and amplitude as to assure a smaller incident beam size during the read period. Conveniently, a defocus pulse may be taken from the potentiometer 23 across the bridge 19, and applied to the focusing electrode 8, so as to dynamically decrease the bombarded area on the target during the read period.

Since the surface of the insulator target is stabilized at or within a few volts of the backing electrode voltage, V, very little, if any, voltage gradient exists in the target. Since some of the targets may have very thin films, this will minimize any possible breakdown or destruction of the film due to high gradients and also prevent any leakage problems from interfering with the measurements. Conductivity of the target has no effect on the measured results, so that semi-conducting or metallic targets can be tested with the method and circuits of this invention.

It should be noted that any decay of target surface voltage during the waiting period from $t_1$ to $t_2$ between target stabilization and read periods is negligible, since the maximum possible change is only a few volts.

While the principles of the invention have been described in connection with specific apparatus, it is to be clearly understood that this description is made only by way of example and not as a limitation to the scope of the invention.

What is claimed is:

1. In a system for secondary emission measurement having an evacuated envelope containing a target for carrying the material to be tested, an electron gun with a control grid, means for focusing an electron beam on said target, and an electron collector near the target, characterized in that means are provided for electrons to bombard a predetermined area of the target to stabilize the electrostatic potential of said area, means for then cutting off the beam for a finite time, means for then successively applying distinct positive and negative potential pulses of measured duration to said collector, means for pulsing on and off the beam during the application of said potential pulses, and means for comparing the target currents during the positive and negative collector pulses.

2. In a system for secondary emission measurement, an evacuated envelope for receiving a target the surface of which is to be tested, an electron gun with a control grid in the envelope, means for focusing an electron beam from said electron gun on said target, means for initiating said beam and maintaining the same with substantially constant beam current for an initial period, an electron collector ring adjacent the target, means for cutting off the beam for a finite time, means for successively applying distinct positive and negative potential pulses of measured duration to said collector, means for pulsing on and off the beam during the application of said potential pulses, and means for comparing the target currents during the positive and negative collector pulses.

3. In the system for secondary emission measurements defined in claim 2, further comprising means for defocusing said electron beam during the times said beam is pulsed on.

4. The method of measuring secondary emission comprising placing the material to be tested in a cathode ray tube, establishing all potentials on the electrodes of the tube and bombarding an area of said material with an electron beam, interrupting the electron beam without disturbing the electrode potentials to permit the potentials of said area to stabilize, applying a distinct voltage to a collector electrode adjacent said area, pulsing on the electron beam during the period the collector is energized, and measuring the target current.

5. The method of measuring secondary emission of a material on a target in a cathode ray tube having a grid-controlled electron beam source and a collector electrode closely adjacent the area to be tested, said method comprising bombarding a finite area of said material with an electron beam, interrupting the bombarding beam for a finite period without disturbing the electric field about said target, applying a distinct potential to said collector, pulsing said beam on and off during the application of the collector potential, and finally measuring the target current produced by said electron beam pulse.

6. The method of measuring secondary emission of a material on a target in a cathode ray tube having a grid-controlled electron beam source and a collector electrode closely adjacent the area to be tested, said method comprising bombarding a finite area of said material with an electron beam having a substantially square beam current wave shape for a first finite period, interrupting said electron beam for a second finite period and simultaneously initiating a sweep of a cathode ray oscilloscope and continuing the same during said second period, applying a distinct potential to said collector electrode for a finite interval during said second period, pulsing said electron beam on and off during said interval, deriving a voltage proportional to the target current produced by said electron beam pulse, and applying said voltage to said cathode ray oscilloscope.

7. The method of measuring secondary emission of a material on a target in a cathode ray tube having a grid-controlled electron beam source and a collector electrode closely adjacent the area to be tested, said method comprising bombarding a finite area of said material with an electron beam having a substantially square beam current wave shape for a first finite period, interrupting said electron beam for a second finite period and simultaneously initiating a sweep of a cathode ray oscilloscope and continuing the same during said second period, applying a distinct potential of one polarity to said collector electrode for a finite interval during said second period, pulsing said electron beam on and off during said interval, deriving a voltage proportional to the target current produced by said electron beam pulse, applying said voltage to said cathode ray oscilloscope, applying a distinct potential of the opposite polarity to said collector electrode for a finite interval during a said second period, pulsing said electron beam on and off during said last named interval, deriving a voltage proportional to the target current produced by the said last named beam pulse, and applying said last named voltage to said cathode ray oscilloscope thereby to observe the ratio of target currents with opposite polarity potentials applied to said collector electrode whereby the secondary emission ratio of material on said target is determined.

References Cited in the file of this patent

UNITED STATES PATENTS

| | | |
|---|---|---|
| 2,454,410 | Snyder | Nov. 23, 1948 |
| 2,603,550 | Bloomsburgh | July 15, 1952 |